United States Patent
Khalid

(10) Patent No.: US 11,152,989 B1
(45) Date of Patent: Oct. 19, 2021

(54) LOCATION-BASED BEAMFORMING MANAGEMENT IN A NETWORK

(71) Applicant: Charter Communications Operating, LLC, St. Louis, MO (US)

(72) Inventor: Saran Khalid, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/842,148

(22) Filed: Apr. 7, 2020

(51) Int. Cl.
*H04B 7/06* (2006.01)
*H04W 16/28* (2009.01)
(Continued)

(52) U.S. Cl.
CPC .......... *H04B 7/0617* (2013.01); *H04W 16/28* (2013.01); *H04W 24/08* (2013.01); *H04W 64/003* (2013.01)

(58) Field of Classification Search
CPC . H04W 72/042; H04W 72/046; H04W 16/28; H04W 4/029; H04W 24/02; H04W 4/02; H04W 64/003; H04W 74/006; H04W 4/025; H04W 72/048; H04W 74/002; H04W 72/00; H04W 72/0406; H04W 72/0413; H04W 24/08; H04B 7/0617; H04B 7/0695; H04B 7/0404; H04B 7/088; H04B 7/0408; H04B 7/086; H04B 7/0608; G01S 5/0273; G01S 7/023
See application file for complete search history.

(56) References Cited

U.S. PATENT DOCUMENTS 8,165,595 B2  4/2012 Xia et al.
2015/0229034 A1  8/2015 Kim et al.
(Continued)

FOREIGN PATENT DOCUMENTS

WO   WO 2016/045467 A1   3/2016

OTHER PUBLICATIONS

"Experimental Analysis of Beamforming in High-Speed Railway Communication" by Wang et al., dated Jan. 26, 2012 (Year: 2012).*
(Continued)

*Primary Examiner* — Daniel Lai
(74) *Attorney, Agent, or Firm* — Armis IP Law, LLC

(57) ABSTRACT

A wireless network environment includes a wireless base station and a communication management resource. The communication management resource can be implemented at any suitable location. During operation, the communication management resource receives first location information indicating that the wireless base station resides at a first location in a network environment. The communication management resource also receives second location information associated with user equipment (mobile communication device). The second location information indicates a second location in the network environment such as a current or anticipated location of the user equipment. The communication management resource derives beamforming settings based on the first location and the second location and communicates the beamforming settings to the wireless base station and the user equipment. In one implementation, the beamforming settings include different pairings of beam angles between the wireless base station and the mobile communication device.

35 Claims, 10 Drawing Sheets

(51) Int. Cl.
  *H04W 24/08* (2009.01)
  *H04W 64/00* (2009.01)

(56) References Cited

U.S. PATENT DOCUMENTS

| | | | |
|---|---|---|---|
| 2016/0049824 A1* | 2/2016 | Stein | H02J 50/20 |
| | | | 320/108 |
| 2017/0195938 A1* | 7/2017 | Gomadam | H04W 40/12 |
| 2018/0075746 A1* | 3/2018 | Jiang | H04W 84/005 |
| 2018/0091202 A1* | 3/2018 | Azogui | H04W 40/14 |
| 2018/0115958 A1* | 4/2018 | Raghavan | H04B 7/0834 |
| 2018/0205420 A1* | 7/2018 | Petersson | H04B 7/0632 |
| 2019/0007889 A1* | 1/2019 | Jayawickrama | H04W 16/14 |
| 2019/0132033 A1* | 5/2019 | Akkarakaran | H04W 52/04 |
| 2019/0289568 A1* | 9/2019 | Pajovic | H04W 64/003 |
| 2019/0327618 A1* | 10/2019 | Li | H04B 7/0452 |
| 2020/0145987 A1* | 5/2020 | Ji | H04W 72/04 |
| 2020/0205085 A1* | 6/2020 | Li | H04B 7/0682 |

OTHER PUBLICATIONS

"Investigation of Secure Wireless Regions Using Configurable Beamforming on WARP" by Zhang et al., dated Apr. 27, 2015 (Year: 2015).*

"Indoor Multi-Wall Path Loss Model at 1.93 GHz" by Li et al., dated Nov. 2013 (Year: 2013).*

"Comparative Analysis of Path Loss Models in Mobile Communications for Urban Case" by Saha, dated Mar. 26, 2016 (Year: 2016).*

* cited by examiner

LOCATION-BASED BEAMFORMING MANAGEMENT IN A NETWORK

BACKGROUND

Conventional wireless networks typically include one or more cells of wireless coverage, each supported by a wireless base station for providing wireless services. By arranging the wireless base stations at regularly spaced intervals, a coverage region of each base station is adjacent a coverage region of another base station, therefore, providing a continuous coverage area from the aggregation of coverage areas emanating from each base station.

Traditional beamforming includes a beam management process supporting initial beam establishment, beam adjustment, and beam recovery. A beam pair is established by using the random access occasion and preamble during initial cell search in Synchronization signal block (SSB). Beam adjustment takes place at the transmitter and receiver end. This process is an iterative process till the best beam-pair has been established.

For a given receiver-side beam, the transmitter side beam is adjusted until the best beam is found. Similarly, for a given transmitter side beam, the best beam is found by adjusting the beam on the receiver side.

This process is tedious and consumes time. For example, 7×3 iterations from the transmitter side and 3×7 from the receiver to the transmitter to find the best beam pair.

In addition, this procedure also involves power ramping i.e., gradual power increase to compensate for pathloss. Wireless transmission mediums such as those promulgated by wireless protocols encounter similar physical limitations as other transmission mediums. For example, distance and interference, both from intervening objects and nearby frequencies, contribute to a signal degradation known as pathloss. Pathloss affects the effective bandwidth of wireless service to user equipment such as cellphones and similar mobile devices.

Conventional beam recovery is a process used to re-establish a beam pair when a beam failure has been detected. Beam failure occurs when RF conditions of a respective wireless network changes due to movement of the receiver or changes in dynamic RF environment such as poor SINR (Signal to Interference Noise Ratio).

In certain instances, beam failure is deemed to have happened when the quality of a link falls below a pre-defined quality metric. Beam identification process takes place to identify a new beam pair. Recovery request transmission is sent to the network in order to establish a new beam-pair.

Beam recovery is a two-step process consisting of preamble transmission and RACH (Radio Access CHannel) response. The network responds to the request. Beam recovery is an iterative process to re-establish an optimum beam-pair between two wireless stations.

BRIEF DESCRIPTION OF EMBODIMENTS

This disclosure includes the observation that conventional beamforming recovery via respective one or more wireless stations is inefficient. For example, beam recovery typically requires exchange of many communications between wireless stations, potentially delaying an amount of time that two wireless stations are able to communicate again. Additionally, the increased interference and noise caused by retransmission of wireless communications during beam recovery further increases communication delays and potentially degrades wireless service to other wireless stations.

Embodiments herein provide novel ways of implementing beamforming in a wireless network environment.

More specifically, a wireless network environment includes a wireless base station and a communication management resource. The communication management resource can be implemented at any suitable location. During operation, the communication management resource receives first location information indicating that a wireless base station resides at a first location in a network environment. The communication management resource also receives second location information associated with user equipment. The second location information indicates a second location in the network environment such as a current or anticipated location of the user equipment. The communication management resource derives beamforming settings based on the first location and the second location and communicates the beamforming settings to the wireless base station and the user equipment.

Further embodiments herein include, via the communication management resource, producing the beamforming settings to indicate multiple pairings of beamforming angles. By way of further example, each of the multiple pairings include: i) a respective beamforming angle for use by the user equipment to communicate with the wireless base station, and ii) a corresponding beamforming angle for use by the wireless base station to communicate with the user equipment. In this manner, the beamforming settings control directional wireless connectivity between user equipment and a respective wireless base station.

In accordance with further example embodiments, the communication management resource produces a pathloss model of a wireless network environment including the wireless base station and the user equipment. As its name suggests, the pathloss model indicates pathlosses in different angular directions with respect to each of the wireless base station and the user equipment (a.k.a. mobile communication device) pair. The communication management resource derives the beamforming settings via calculation of pathlosses along first angular paths (such as from the wireless base station to the user equipment) and second angular paths (such as from the user equipment to the wireless base station) using the pathloss model.

Further embodiments herein include, via the communication management resource, storing beamforming settings associated with the first location and the second location prior to detecting presence of the user equipment at the second location. In one embodiment, the stored beamforming settings for the first location and the second location are used to derive beamforming settings based on the received first location and the second location. For example, in one embodiment, the communication management resource derives the beamforming settings for the user equipment and the wireless base station via mapping (such as via a lookup table) a combination of the first location and the second location to the beamforming settings.

In yet further example embodiments, in addition to generating the beamforming settings based on the first location and the second location, the communication management resource generates the beamforming settings based at least in part on antenna attributes of the user equipment and antenna attributes of the wireless base station.

Further embodiments herein include monitoring movement of the user equipment in the wireless network environment and generating the beamforming settings based on the detected movement. For example, as previously discussed, the user equipment may reside at a second location in the wireless network environment. The communication management resource monitors directional movement of the user equipment moving from the second location towards a third location. Based on the directional movement, and anticipation that the user equipment will eventually reside at the third location, the communication management resource derives second beamforming settings based on the first location and the third location. In one embodiment, such as prior to or when the user equipment resides at the third location, the communication management resource communicates the second beamforming settings to the wireless base station and the user equipment to accommodate continuous communications during the movement and while the user equipment resides at the third location.

Further embodiments herein include, via the communication management resource, repeatedly generating and communicating updated beamforming settings to the wireless base station and the user equipment in response to detecting movement of the user equipment.

In still further example embodiments, the second beamforming information (settings) indicates multiple directional settings with respect to the third location. While at the third location, the user equipment has the option of using any of the multiple directional settings that are suitable. In one embodiment, each of the different directional beamforming settings in the second beamforming information is assigned a priority value indicating which of the beamforming settings is the first best directional setting, second best directional setting, third best directional setting, etc., to communicate from the user equipment to the wireless base station while at the third location.

In a similar manner, the communication management resource can be configured to assign different directional beamforming settings to the wireless base station depending on a location of the user equipment in the wireless network environment.

Accordingly, embodiments herein include, via the communication management resource, producing the beamforming settings to include priority information and multiple directional settings, the priority information indicating a priority ranking associated with each of multiple directional settings.

In accordance with further example embodiments, different beamforming directions in the beamforming settings are selectable by the user equipment and the wireless base station.

As previously discussed, generation of the beamforming settings can occur for any suitable reason. For example, in one embodiment, the communication management resource derives the beamforming settings based on detecting movement of the user equipment to the second location. Additionally, or alternatively, the communication management resource produces the beamforming settings in response to detecting degradation of communications between the user equipment and the wireless base station.

Note further that the beamforming settings (such as directional possibilities and assigned priority values) can be generated in any suitable manner. For example, the beamforming setting can be generated based on trial and error. Such historical information about which directional settings work at each of multiple different locations can be stored in a lookup table.

Additionally, or alternatively, embodiments herein include generating a model of different obstacles (trees, buildings, fences, geographical contours, etc.) in a wireless network environment. Based on such information, the communication management resource can be configured to calculate different path losses associated with different directional beamforming settings suitable to support communications between the wireless base station and the user equipment at a particular location. As previously discussed, the user equipment may roam about in a wireless network environment. In one embodiment, using the path-loss model, the communication management resource repeatedly identifies different directional settings suitable for the current location of the user equipment or anticipated subsequent location of the user equipment.

Note that any of the resources as discussed herein can include one or more computerized devices, wireless access points, wireless base stations, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by computer processor hardware, cause the computer processor hardware (such as one or more co-located or disparately processor devices) to: receive first location information indicating that a wireless base station resides at a first location in a network environment; receive second location information associated with user equipment, the second location information indicating a second location in the network environment; derive beamforming settings based on the first location and the second location; and communicate the beamforming settings to the wireless base station and the user equipment.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of supporting different wireless services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
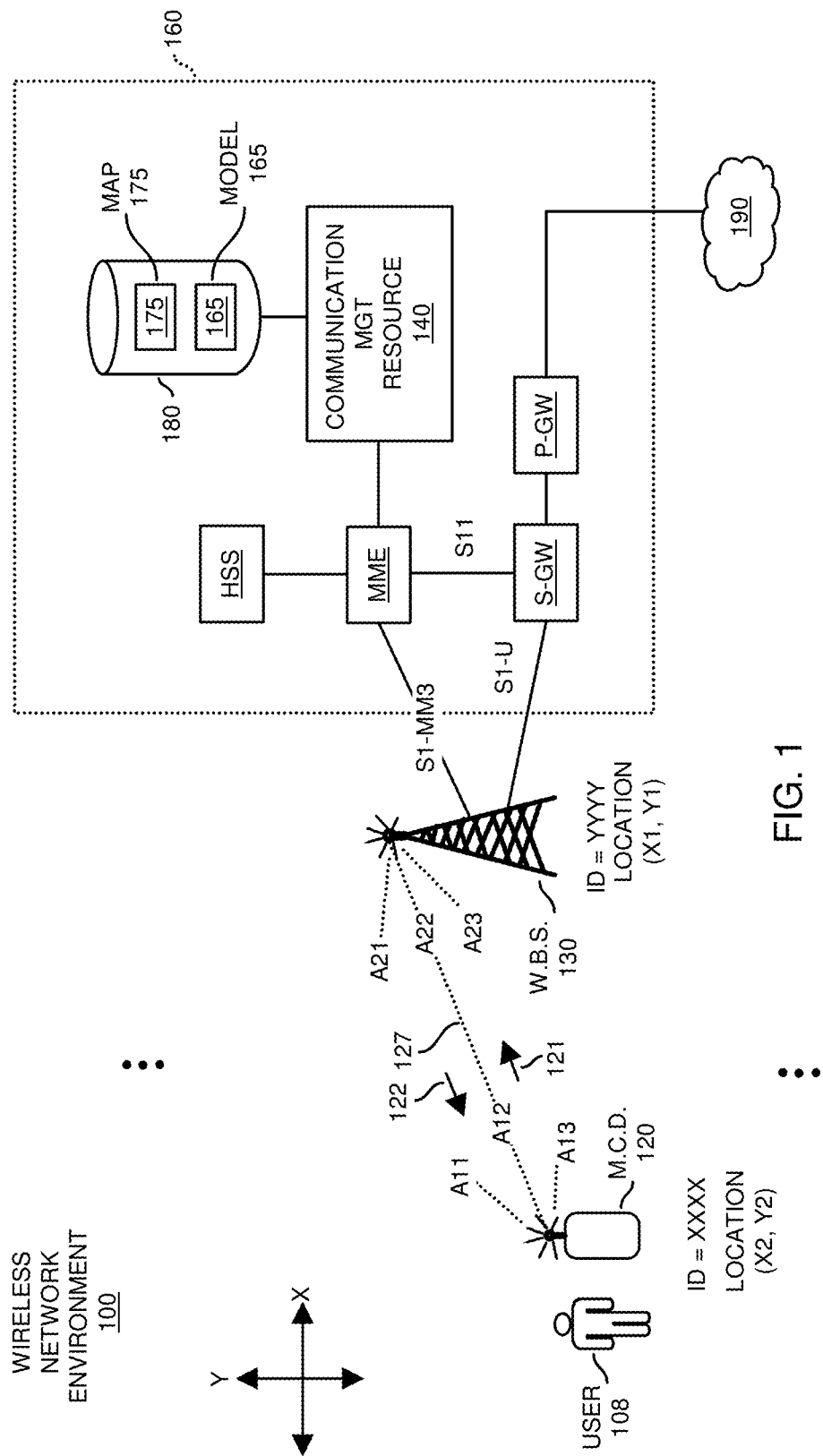
FIG. 1 is an example diagram illustrating a communication management resource and implementation of beamforming according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In accordance with general embodiments, a wireless network environment includes a wireless base station, a mobile communication device, and a communication management resource. The communication management resource can be implemented at any suitable location. During operation, the communication management resource receives first location information indicating that the wireless base station resides at a first location in a network environment. The communication management resource also receives second location information associated with user equipment (mobile communication device). The second location information indicates a second location in the network environment such as a current or anticipated future location of the user equipment. The communication management resource derives beamforming settings based on the first location and the second location and distributes the beamforming settings to the wireless base station and the user equipment. In one implementation, the beamforming settings include different pairings of beams between the wireless base station and the mobile communication device.

Now, more specifically, FIG. 1 is an example diagram illustrating a communication management resource and implementation of beamforming according to embodiments herein.

As shown, wireless network environment 100 includes wireless base station 130, mobile communication device 120, and network management resource 160 (a.k.a., wireless network core).

User 108 operates the mobile communication device 120. Via communications over wireless communication link 127, the wireless base station 130 provides the mobile communication device 120 and corresponding user 108 connectivity to the remote network 190 such as the Internet, remote wireless network, etc.

As further shown in this example embodiment, network management resource 160 includes resources HSS (Home Subscriber Service), MME (Mobile Management Entity), S-GW (Serving Gateway), P-GW (Packet Data Network Gateway), etc. In one embodiment, network management resource 160 provides and controls connectivity between wireless base station 130 and the remote network 190 such as the Internet.

In accordance with further example embodiments, the network management resource 160 controls connectivity between the mobile communication device 120 and the wireless base station 130. To this end, the network management resource 160 includes communication management resource 140 and corresponding repository 180. Repository 180 stores model 165 and map information 175.

In one embodiment, the communication management resource 140 creates and uses the model 165 (such as a pathloss model) to identify different path losses associated with multiple wireless stations (such as mobile communication device 120 and the wireless base station 130).

Note that communication management resource 140 as described herein can be implemented at any suitable location. In one embodiment, the communication management resource is executed via processing resources in the network management resource 160. Additionally, or alternatively, the communication management resource 140 can be implemented by a respective wireless base station 130, mobile communication device 120, etc.

Note that the model 165 and/or corresponding map information 175 can be stored any suitable one or more locations such as wireless base station 130, mobile communication device 120, etc. In such an instance, the wireless base station 130 and mobile communication device 120 determine, via the model 165 and/or map information 175, what best beamforming should be implemented based on a current or anticipated location of the mobile communication device 120.

In yet further example embodiments, different portions of the communication management resource 140 can be implemented via a combination of resources disposed at different locations such as mobile communication device 120, wireless base station 130, network management resource 160, etc.

Further note that the processing resources in wireless network environment 100 can be implemented in any suitable manner. For example, the communication management resource 140 can be implemented as communication management hardware, communication management software, or a combination of communication management hardware, communication management software.

As an example of operation and supporting beamforming, assume that the communication management resource 140 receives first location information such as coordinates (X1, Y1) indicating that a wireless base station 130 resides at a first location in a network environment.

The communication management resource 140 also receives second location information such as coordinates (X2, Y2) associated with mobile communication device 120 (i.e., user equipment). The second location information indicates a second location in the network environment 100 such as a current location of the mobile communication device 120 or an anticipated future location where the mobile communication device 120 is expected to reside.

In one embodiment, via communications 121, the mobile communication device 120 communicates its location (X2, Y2) to the wireless base station 130; the wireless base station 130 forwards the location information to the communication management resource 140.

In yet further example embodiments, each of the wireless base station 130 and the mobile communication device 120 supports transmission and reception of wireless communications in any of multiple different angular directions.

More specifically, as shown in FIG. 1, mobile communication device 120 supports transmission and reception of wireless communications in different angular (horizontal and/or vertical) directions A11, A12, A13, etc. The wireless base station 130 supports transmission and reception of wireless communications in different angular (horizontal and/or vertical) directions A21, A22, A23, etc.

As previously discussed, the communication management resource 140 generates beamforming settings for use by the wireless stations. For example, the communication management resource 140 derives beamforming settings based on the first location (of the wireless base station 130) and the second location (of the mobile communication device 120).

In one embodiment, the model 165 in repository 180 is a pathloss model in which to calculate/determine wireless path losses in different angular directions from each location in the wireless network environment 100. Via the model 165, and/or information in the map 175 (such as indicating calculated, learned, and/or tested beamforming paths for different locations of the mobile communication device 120), the communication management resource 140 generates subsequent beamforming settings for use by the wireless base station 130 and the mobile communication device 120.

In accordance with further example embodiments, the communication management resource 140 communicates the beamforming settings (generated from the provided location information) to the wireless base station 130 and the mobile communication device 120 (user equipment).

The communication management resource 140 can be configured to generate the beamforming settings in any suitable manner. For example, in one embodiment, the communication management resource 140 produces the beamforming settings for use by the wireless base station 130 and the mobile communication device 120 to indicate multiple pairings of beamforming angles to be implemented by the mobile communication device 120 and the wireless base station 130. By way of further example, for uplink communications, each of the multiple beamforming pairings include: i) a respective beamforming angle for use by the mobile communication device 120 to wirelessly transmit communications to the wireless base station 130, and ii) a corresponding beamforming angle for use by the wireless base station 130 to receive wireless communications from the mobile communication device 120 transmitting at the respective beamforming angle.

For downlink communications, each of the multiple pairings include: i) a respective beamforming angle for use by the wireless base station 130 to wirelessly transmit communications to the mobile communication device 120, and ii) a corresponding beamforming angle for use by the mobile communication device 120 to receive wireless communications from the wireless base station 130 transmitting at the respective beamforming angle.

If desired, a first beamforming angle assigned to the mobile communication device 120 can be used to both transmit wireless communications to and receive wireless communications from the wireless base station 130; a second beamforming angle assigned to the wireless base station 130 can be used to both transmit wireless communications to and receive wireless communications from the mobile communication device 120.

Note further that the beamforming settings (such as directional possibilities and potentially assigned priority values) can be produced by the communication management resource 140 in any suitable manner. For example, the beamforming settings can be generated based on trial and error via testing of different beamforming angles of transmitting/receiving communications from the wireless base station 130 and the mobile communication device 120; beamforming settings can be generated based on pathloss in the wireless network environment as indicated by the model 165; etc.

If desired, the different beamforming settings associated with different locations in the network environment 100 can be stored in map 175. In one embodiment, the map 175 is a lookup table that stores information such as calculated, learned, historical, etc., beamforming settings information about which directional settings provide appropriate connectivity between the wireless base station 130 and the mobile communication device 120 for each of multiple different locations in the wireless network environment 100.

Thus, embodiments herein include a computer aided (such as via communication management resource 140) smart beam selection. In one embodiment, the communication management resource 140 includes a so-called big data platform and a corresponding computer that implements high speed, real time computing to generate the beamforming settings.

In accordance with further example embodiments, the communication management resource 140 is a smart propagation generator including a big data and computing resources being managed and run by a management resource such as Openstack™. In such an instance, the communication management resource 140 is responsible for running, managing, and controlling cloud resources.

Note that the communication management resource 140 can be configured to run various instances to aid the network in beam selection for different frequencies, user equipment types, equipment and conditions pre-defined in the system.

Note further that, in alternative embodiments, the mobile communication device 120 is user equipment disposed at fixed location. The communication management resource 140 can be configured to support generation of beamforming settings for both fixed user equipment and mobile communication devices.

Figure 2:
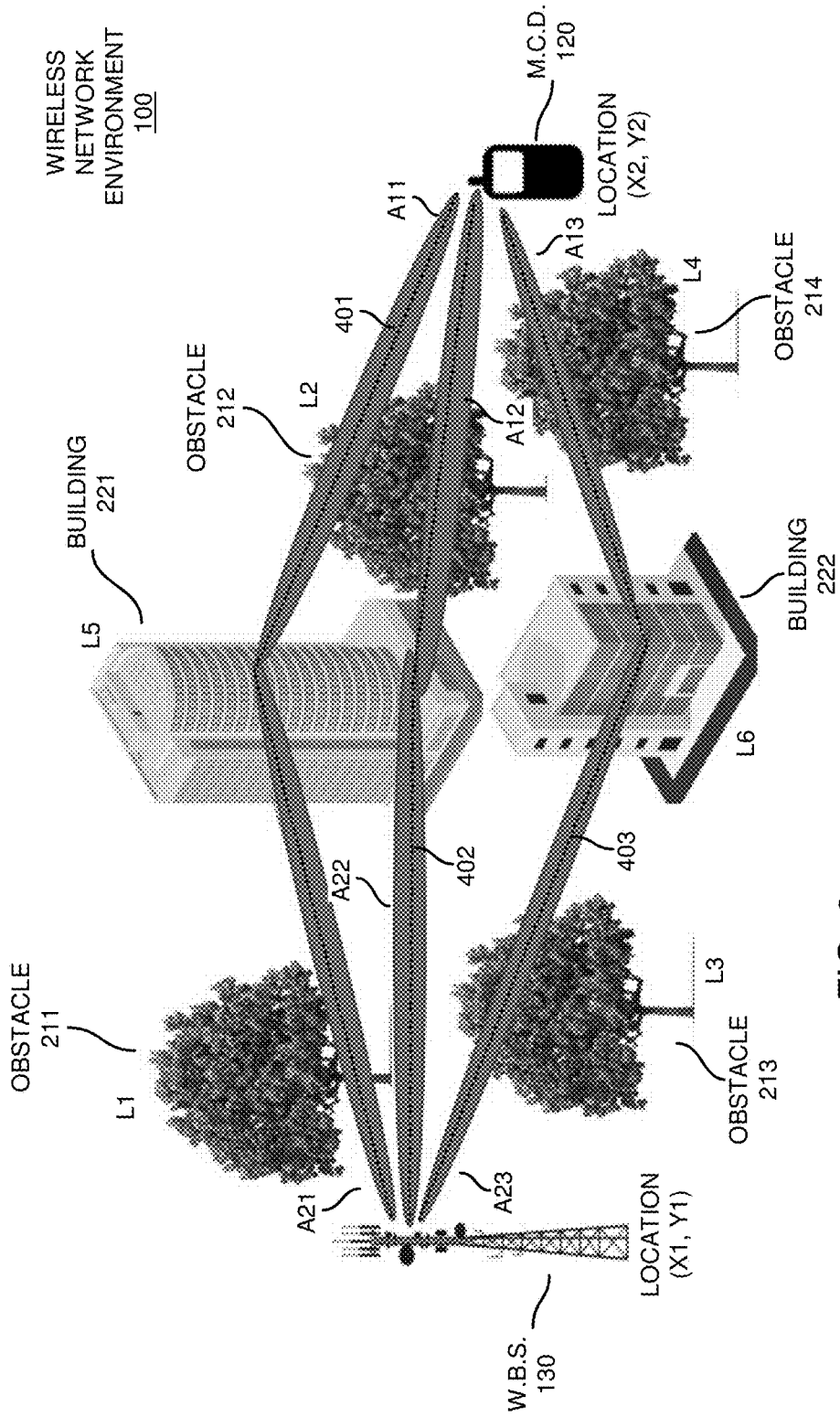
FIG. 2 is an example diagram illustrating attributes of a wireless network environment and beamforming in a wireless network environment according to embodiments herein.

FIG. 2 is an example diagram illustrating attributes of wireless network environment and derivation of a respective wireless pathloss model according to embodiments herein.

As shown, the wireless network environment 100 includes different sized and different shaped objects (such as causing wireless clutter, interference, reflections, etc.) present at different locations. Each object (such as tree, building, terrain, etc.) in the wireless network environment 100 has its own unique effect on conveyance and pathloss of respective wireless signals. For example, the objects in wireless network environment 100 can reflect wireless signals; the objects in wireless network environment 100 can absorb wireless signals; etc.

In this example embodiment, wireless network environment 100 includes objects such as obstacle 211 (such as a first tree) at location L1, obstacle 212 (such as a second tree) at location L2, obstacle 213 (such as a third tree) at location L3, obstacle 214 (such as a fourth tree) at location L4, etc.

As further shown, the wireless network environment 100 includes multiple obstacles such as buildings that affect the ability to convey wireless signals in the wireless network environment 100 from one wireless station to another. For example, wireless network environment 100 includes building 221 residing at location L5; wireless network environment 100 includes building 222 residing at location L6; and so on.

In one embodiment, the communication management resource 140 (or other suitable entity) generates the model 165 based on the attributes of the different obstacles present in the wireless network environment 100. Simulations associated with the model 165 provide a way to identify pathlosses and respective suitable wireless communication paths (at different angles) extending between the multiple wireless stations.

In most instances, a line of site path between wireless stations is typically a best communication path between wireless stations, providing lowest path loss if no obstacles are in such a path. In certain instances, obstacles may provide good reflective properties, rendering such non line of site paths as being good communication paths as well. One embodiment herein includes ranking the different possible communication paths based on calculated pathloss.

In this example embodiment, assume that each path in the wireless network environment 100 has a different associated pathloss. For example, path 401 extends between the wireless base station 130 at location X1,Y1 and the mobile communication device 120 at location X2,Y2. A first end of the path 401 is defined by angle A21 at the wireless base station 130; a second end of the path 401 is defined by the angle A11 at the mobile communication device 120. Based on distance as well as objects (such as trees, buildings, terrain, etc.) in the wireless network environment 100, using the model 165, the communication management resource 140 determines that the path 401 has a first pathloss value PLV1.

A first end of the path 402 is defined by angle A22 at the wireless base station 130; a second end of the path 402 is defined by the angle A12 at the mobile communication device 120. Based on distance as well as objects (such as trees, buildings, terrain, etc.) in the wireless network environment 100, the path 402 is determined by the communication management resource 140 as having a second pathloss value PLV2 using model 165.

A first end of the path 403 is defined by angle A23 at the wireless base station 130; a second end of the path 403 is defined by the angle A13 at the mobile communication device 120. Based on distance as well as objects (such as trees, buildings, terrain, etc.) in the wireless network environment 100, the path 403 is determined by the communication management resource 140 as having a third pathloss value PLV3 using model 165.

In theory, there are an infinite number of wireless paths between the wireless base station 130 and the mobile communication device 120 for any given location information. In one embodiment, the communication management resource 140 uses the model 165 to identify (calculate based on different angles) which of the many possible paths between the wireless stations has the lowest pathlosses. Such paths are good candidates as supporting wireless communications between the mobile communication device 120 and the wireless base station 130.

Note further that the best possible wireless communication paths in the wireless network environment 100 can be determined via trial and error as well. For example, for the current location (X2,Y2), the mobile communication device 120 and wireless base station 130 can be configured to test (amongst themselves) which possible paths at different angles provide the lowest pathloss. As previously discussed, in one embodiment, the map 175 stores such information.

In accordance with further example embodiments, the communication management resource 140 executes a software algorithm that runs a propagation formula such as fast ray tracing to determine the best beam combinations for both transmitter and receiver side. In one embodiment, the algorithm uses an instance of big-data to calculate pathloss and therefore the signal strength along with the best MCS and SINR achievable for a given beam combination.

In accordance with further embodiments, note that the communication management resource can be configured to include an algorithm to determine pathloss and therefore the best beam pair is loaded with antenna patterns of the transmitter and receiver. The algorithm works in real time and updates the EPC in real time.

In one embodiment, the communication management resource 140 and model 165 use data such as antenna patterns, power levels, geo-database, etc., to determine the best beam pairs for both transmitter and receiver. This information is determined by emulating transmitter and receiver in the program associated with the communication management resource 140 and corresponding model 165.

The program gets live information on the UEs (user equipment), such as antenna patterns, live location, all possible beamforming patterns services, etc., and delivers the top beam 10 beam pairs to the EPC. This allows the system to skip some of the steps and messaging in traditional beam selection.

In accordance with further embodiments, the MME directs the wireless base station 130 (such as an eNodeB) to use the best calculated beam, while skipping the beam search process and starting with the best beam.

Similarly, during the beam recovery process, the steps to find the best beam can be skipped and the database (map 175) will be consulted to find the next best beam.

Figure 3:
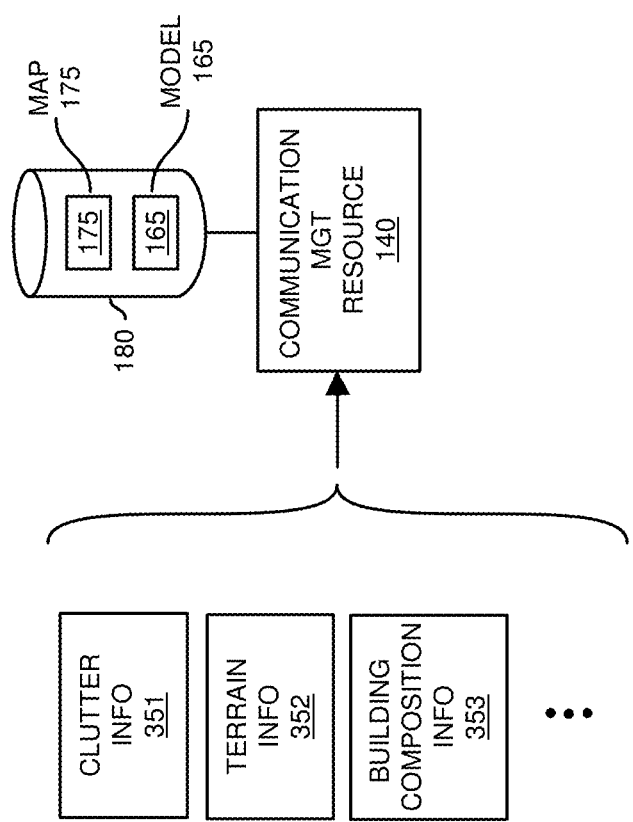
FIG. 3 is an example diagram illustrating receipt of attributes of a wireless network environment and derivation of a respective wireless pathloss model and map information according to embodiments herein.

FIG. 3 is an example diagram illustrating receipt of attributes of a wireless network environment and derivation of a respective wireless pathloss model and map information according to embodiments herein.

As previously discussed, the communication management resource 140 as described herein can be configured to implement a model 165 (such as a pathloss model) of the wireless network environment 100 including the wireless base station 130 and the mobile communication device 120 (user equipment). In such an instance, as its name suggests, the pathloss model 165 indicates pathlosses (such as signal attenuations) in different angular directions with respect to each of the different locations in wireless network environment 100. Respective communication paths determined as having a lower pathloss value are more useful because they provide, in theory, better wireless connectivity between wireless stations (such as wireless base station 130, mobile communication device 120, etc.).

The communication management resource 140 derives the beamforming settings via calculation of pathlosses along first angular paths (such as, for a given location of the wireless base station 130 and a given location of the mobile communication device 120, from the wireless base station to the user equipment) and second angular paths (such as from the user equipment to the wireless base station) using the pathloss model.

In one embodiment, big data instances (such as model 165) associated with the communication management resource 140 collectively represent a digitized form or attributes of the RF characteristics of wireless network environment 100.

As shown, the communication management resource 140 receives clutter information 351 (such as indicating object information including shapes, height, widths, location, etc.), terrain information 352, building composition information 353, etc., to produce the model 165. Based on such information, as previously discussed, the model 165 provides a way to determine the different pathlosses in different angular directions.

In one embodiment, the building composition information 353 indicates material used to fabricate the buildings and provides a way to determine reflections, absorption, etc., associated with such objects. In one embodiment, material information is obtained via street view imagery to determine the type of material used in construction of the building. Additionally, or alternatively, the building composition information can be received via city government databases, on-site inspections, etc.

Accordingly, embodiments herein include generating a model of different obstacles (trees, buildings, fences, geographical contours, etc.) in a wireless network environment 100. Based on such information, the communication management resource 140 calculates different path losses associated with different directional beamforming settings suitable to support communications between the wireless base station 130 and the mobile communication device 120 at a particular location. As previously discussed, the mobile communication device 120 may roam about in wireless network environment 100. In one embodiment, using the pathloss model 165, the communication management resource 140 repeatedly updates and identifies different directional settings suitable for the current location of the user equipment or anticipated subsequent location of the user equipment.

In case of fixed subscribers, note that the communication management resource 140 can be configured to find top 10 beams for the mobile communication device location. If a currently implemented beam (path) becomes disrupted, another path can be selected for use. However, if RF environment changes due to construction or other event, the beams will be re-calculated and the system will be notified. If the other RF factors change, the model is updated.

In case of mobility subscribers, the location of the mobile communication device 120 will be constantly updated and fed to the communication management resource 140, which will continue to determine (via calculations or lookup table) the best 3-5 beams (and corresponding angle information) and update the core network on the top beams. If the best beam fails to provide sufficient wireless link quality between the wireless base station 130 and the mobile communication device 120 (such as due to parameters/KPIs sinking to pre-defined levels), the communication management resource 140 re-evaluates via the model 165 and finds a new set of best communication paths (and beam angles) in real time.

In one embodiment, the best beam generated for the receiver side is communicated to the receiver over SSB and it is immediately adjusted away in real time to provide wireless connectivity instead of having to wait multiple time slots.

In further example embodiments, the communication management resource 140 and corresponding model 165 supports determination of different beamforming settings for each 1 meter by 1 meter grid (bin) in the wireless network environment 100. The communication management resource 140 and model 165 and map 175 provide a way to determine and/or calculate pathloss for each bin based on corresponding given clutter type, terrain, cutter height, type of building, etc., in that bin.

In a similar manner as previously discussed, the amount of path loss is predefined or pre-calculated using model 165 (such as an empirical, deterministic, or hybrid model formula).

At each bin location, signal level is calculated for all beams in 360 degree and the in the direction receiver is calculated. The best beam paths are determined for a given wireless base station 130 and mobile communication device 120.

Figure 4:
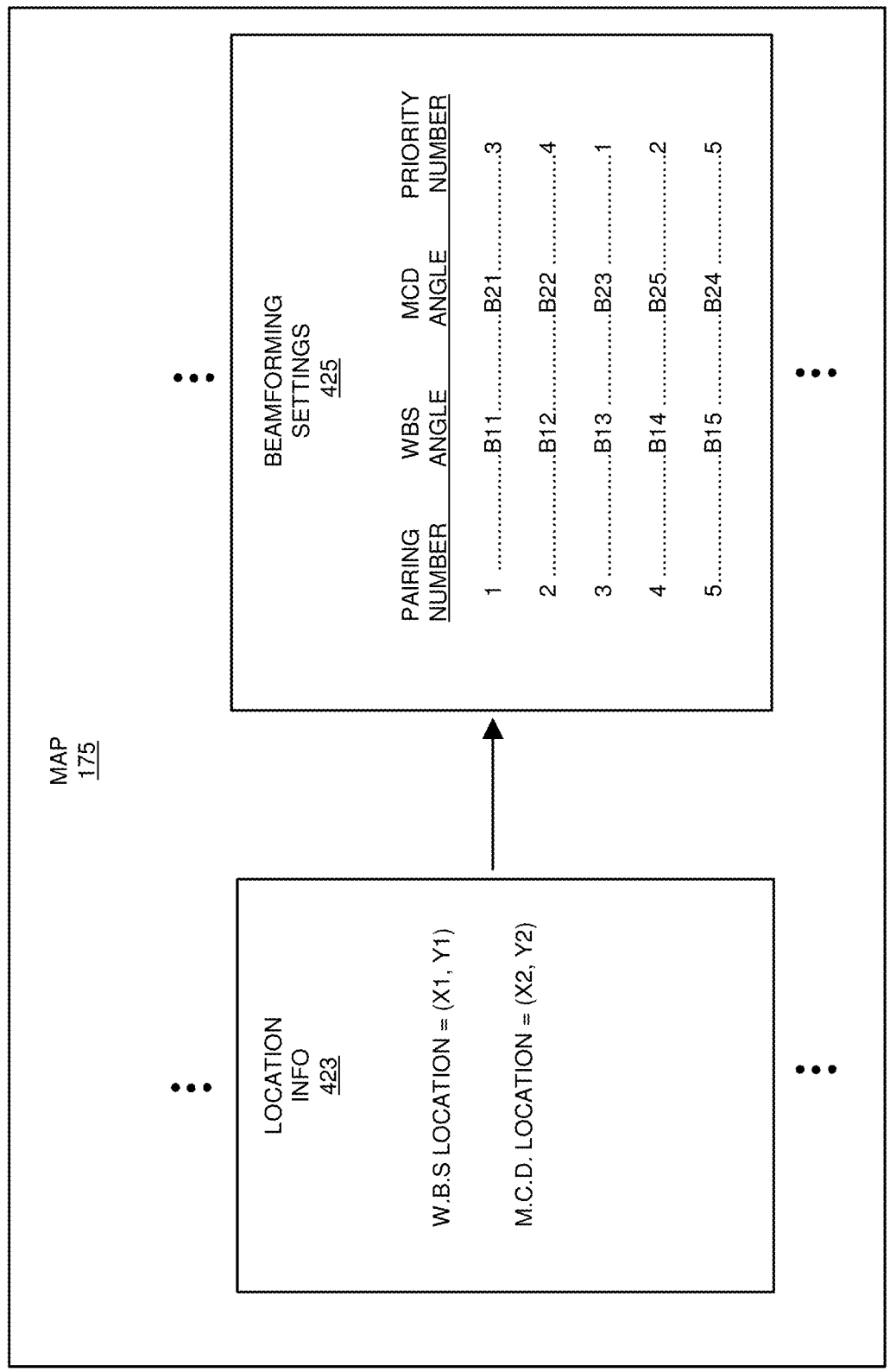
FIG. 4 is an example diagram illustrating generation of beamforming settings based on locations of a wireless base station and mobile communication device according to embodiments herein.

FIG. 4 is an example diagram illustrating generation of beamforming settings based on locations of a wireless base station and mobile communication device according to embodiments herein.

In this example embodiment, the map 175 indicates beam settings 425 supporting communications between the wireless base station 130 and the mobile communication device 120 when the mobile communication device 120 is at location (X2,Y2) and wireless base station 130 is at fixed location (X1,Y1). As previously discussed, the beam setting information can be calculated in real-time when it is needed by the wireless stations or predetermined and stored in the map 175.

Beam setting information 425 includes multiple angle-pairing that define respective paths between the wireless stations.

As further shown in FIG. 4, each of the paths (labeled as a pairing number) is assigned a respective priority number.

In one embodiment, the priority number indicates which path provides the lowest pathloss. For example, pairing number 3 (i.e., path #3) provides a lowest pathloss between the mobile communication device 120 and the wireless base station 130; pairing number 4 (i.e., path #4) provides a second lowest pathloss between the mobile communication device 120 and the wireless base station 130; pairing number 1 (path #1) provides a third pathloss between the mobile communication device 120 and the wireless base station 130; pairing number 2 (path #2) provides a fourth lowest pathloss between the mobile communication device 120 and the wireless base station 130; pairing number 5 (path #5) provides a fifth lowest pathloss between the mobile communication device 120 and the wireless base station 130.

In yet further example embodiments, note that in addition to generating the beamforming settings based on the location of the mobile communication device 120 and the location of the wireless base station 130, the communication management resource 140 generates the beamforming settings based at least in part on antenna attributes of the mobile communication device 120 and antenna attributes of the wireless base station 130.

Figure 5:
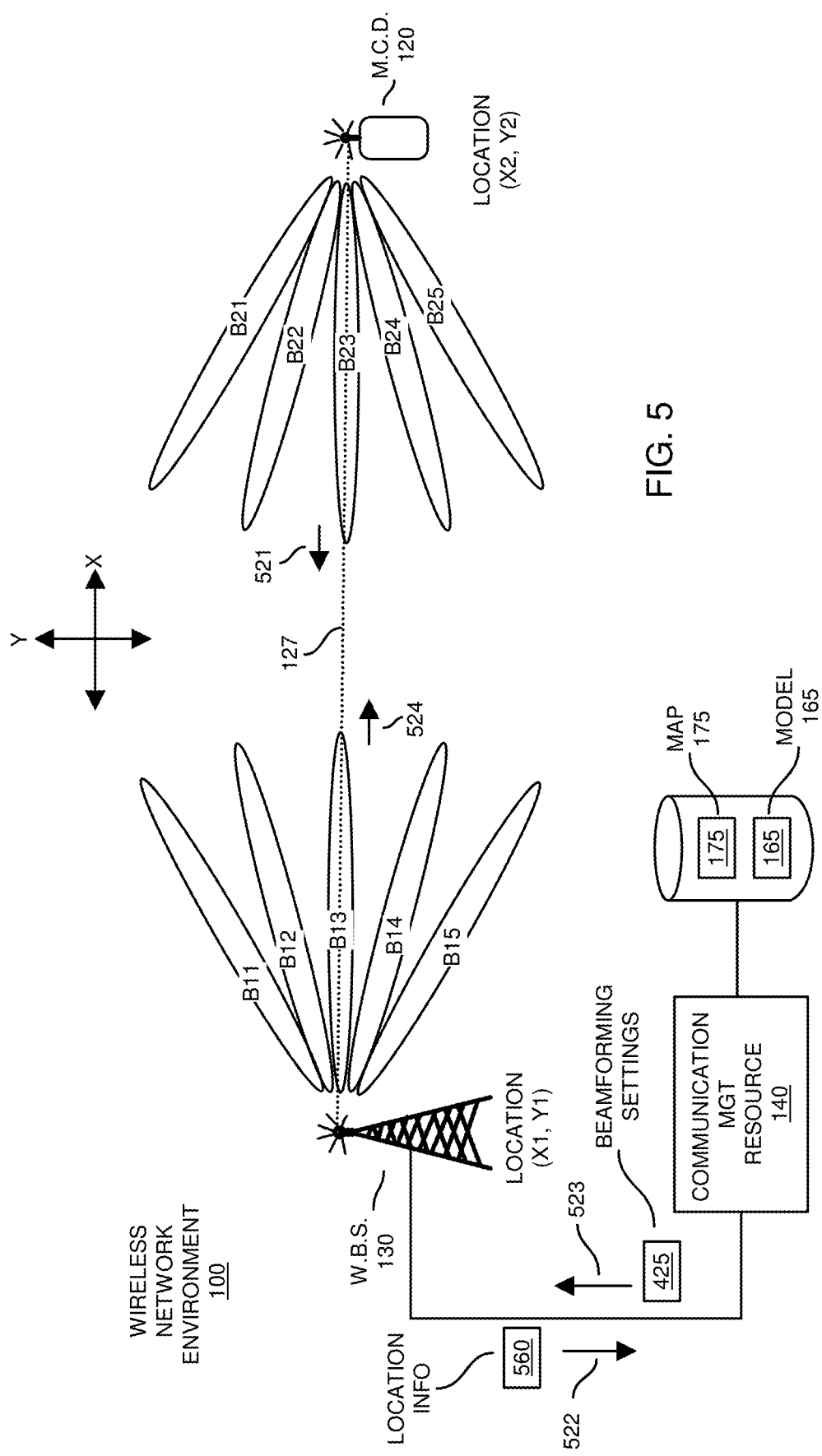
FIG. 5 is an example diagram illustrating implementation of beamforming options based on location according to embodiments herein.

An example of implementing one or more paths is shown in FIG. 5 below.

FIG. 5 is an example diagram illustrating implementation of beamforming options based on location according to embodiments herein.

In this example embodiment, the mobile communication device 120 or other suitable entity communicates a location (X2,Y2) of the mobile communication device 120 to the wireless base station 130 such as via communications 521. The wireless base station 130 communicates the location of the mobile communication device 120 and potentially the location of the wireless base station 130 as location information 560 to the communication management resource via communications 522.

As previously discussed, based on the locations of the mobile communication device 120 and the wireless base station 130, the communication management resource 140 converts the location information to beamforming settings 425. More specifically, the communication management resource 140 generates beamforming settings 425 for the location X1,Y1 and the location X2,Y2.

In one embodiment, the beamforming settings are pre-generated based on prior use (such as historical use) of the settings in the wireless network environment 100. In such an instance, the communication management resource 140 derives the beamforming settings 425 for the mobile communication device 120 and the wireless base station 130 via mapping a combination of the first location X1,Y1 and the second location X2,Y2 to the beamforming settings 425.

Additionally, or alternatively, as previously discussed, the communication management resource 140 calculates the beamforming settings based on the model 165.

Further in this example embodiment, via communications 523, the communication management resource 140 (or other suitable entity) communicates the beamforming settings 425 to the wireless base station 130. The wireless base station 130 uses the beamforming settings 425 to identify the different possible communication paths and corresponding wireless base station angles B11, B12, B13, B14, and B15 as previously discussed.

The wireless base station 130 communicates all or a portion of the beamforming settings 425 over the wireless communication link 127 to the mobile communication device 120 via communications 524.

Accordingly, the mobile communication device 120 is notified of the different angular settings B21, B22, B23, B24, and B25 associated with the mobile communication device 120 while at location X2, Y2.

In accordance with further example embodiments, different beamforming directions and paths defined by the beamforming settings 425 are selectable by the mobile communication device 120 and/or wireless base station 130.

Via the beamforming angles and priority information in the beamforming settings 425, the wireless stations communicate with each other.

For example, because the pairing #3 is identified by the beamforming settings 425 (in FIG. 4) is assigned the highest priority, the wireless base station 130 and the mobile communication device 120 attempt to communicate with each other via respective wireless base station angle B13 and mobile communication device angle B23. In such an instance, based on the selected pairing #3, the wireless base station 130 transmits and receives wireless signals over wireless communication link 127 at an angle of B13; the mobile communication device 120 transmits and receives wireless signals over wireless communication link 127 at an angle of B23.

If the corresponding path #3 (pairing #3) does not provide sufficient wireless link quality (such as detected by either between the wireless base station 130 and/or the mobile communication device 120), the wireless stations attempt to communicate over the next highest priority path, which is pairing #4 implementing wireless base station angle B14 and the mobile communication device angle B25. In such an instance, based on the selected pairing #4, the wireless base station 130 transmits and receives wireless signals over wireless communication link 127 at an angle of B14; the mobile communication device 120 transmits and receives wireless signals over wireless communication link 127 at an angle of B25.

Still further, if the corresponding path #4 (pairing #4) does not provide sufficient wireless link quality between the wireless base station 130 and the mobile communication device 120, the wireless stations attempt to communicate over the next highest priority path, which is pairing #1 implementing wireless base station angle B11 and the mobile communication device angle B21. In such an instance, based on the selected pairing #1, the wireless base station 130 transmits and receives wireless signals over wireless communication link 127 at an angle of B11; the mobile communication device 120 transmits and receives wireless signals over wireless communication link 127 at an angle of B21.

Yet further, if the corresponding path #1 (pairing #1) does not provide sufficient wireless link quality between the wireless base station 130 and the mobile communication device 120, the wireless stations attempt to communicate over the next highest priority path, which is pairing #2 implementing wireless base station angle B12 and the mobile communication device angle B22. In such an instance, based on the selected pairing #2, the wireless base station 130 transmits and receives wireless signals over wireless communication link 127 at an angle of B12; the mobile communication device 120 transmits and receives wireless signals over wireless communication link 127 at an angle of B22.

Finally, if the corresponding path #2 (pairing #2) does not provide sufficient wireless link quality between the wireless base station 130 and the mobile communication device 120, the wireless stations attempt to communicate over the next highest priority path, which is pairing #5 implementing wireless base station angle B15 and the mobile communication device angle B24. In such an instance, based on the selected pairing #5, the wireless base station 130 transmits and receives wireless signals over wireless communication link 127 at an angle of B15; the mobile communication device 120 transmits and receives wireless signals over wireless communication link 127 at an angle of B24.

In this manner, the wireless stations switchover to different beamforming (transmitter-receiver angle) pairings depending on current environmental conditions.

Figure 6:
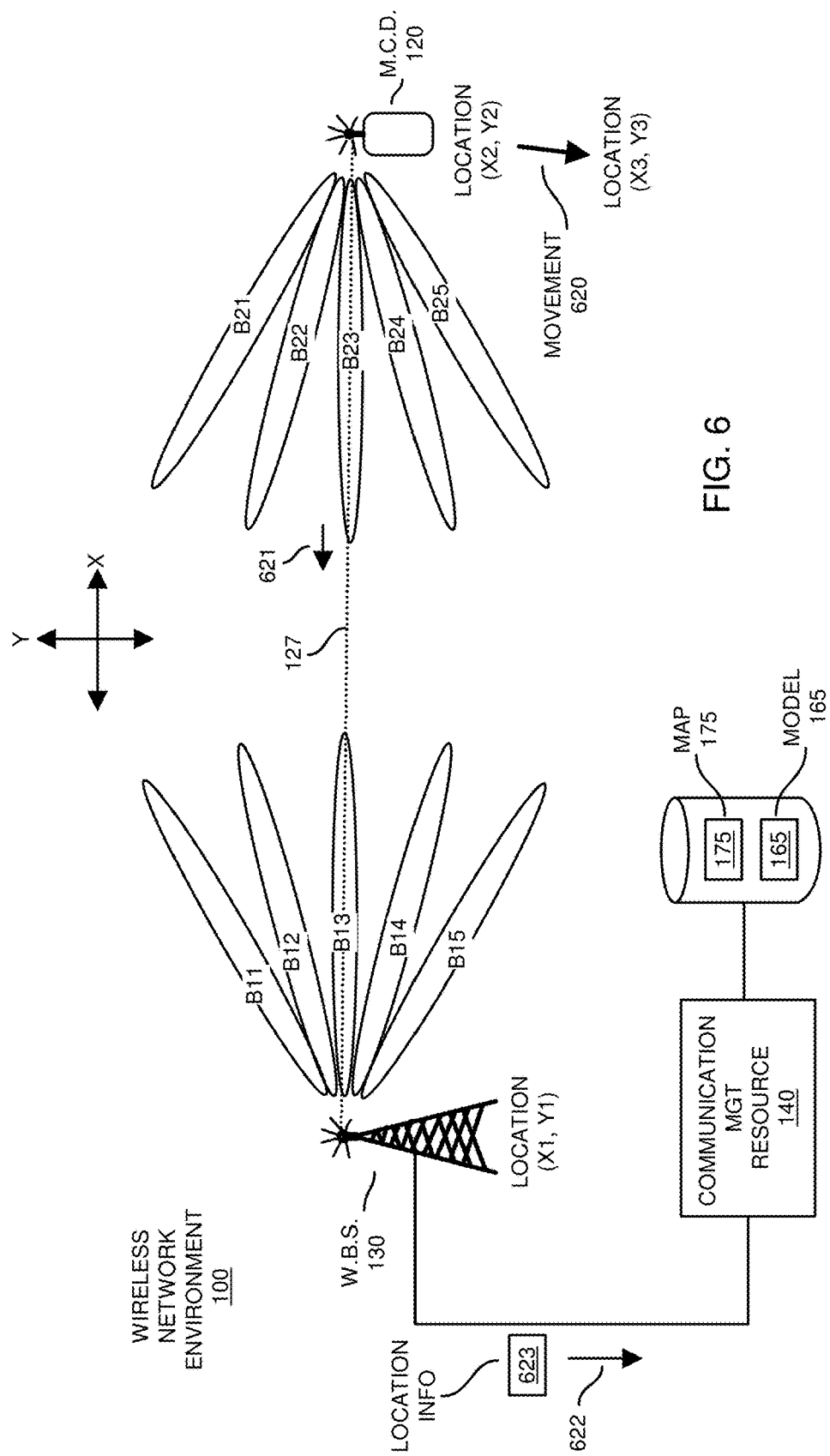
FIG. 6 is an example diagram illustrating monitoring of a mobile communication device according to embodiments herein.

FIG. 6 is an example diagram illustrating monitoring of a mobile communication device according to embodiments herein.

As shown, further embodiments herein include monitoring movement 620 of the mobile communication device 120 in the wireless network environment 100 and generating the beamforming settings based on the detected movement 620.

For example, as previously discussed, the mobile communication device 120 initially resides at a location (X2,Y2) in the wireless network environment 100. As previously discussed, the beamforming settings 425 support communications over wireless communication link 127.

Via communications from the mobile communication device 120 or other suitable entity, the communication management resource 140 receives a location of the mobile communication device 120 and monitors directional movement 620 of the mobile communication device 120 moving from the location X2,Y2 towards a new location X3,Y3.

The movement 620 of the mobile communication device 120 can be monitored in any suitable manner.

In one embodiment, the mobile communication device 120 uses GPS capability to determine its current location and communicates the corresponding current location information of the mobile communication device 120 over the wireless communication link 127 to the wireless base station 130 via communication 621. The wireless base station 130 communicates the received location information 623 (such as including a location of the wireless base station 130 as well) to the communication management resource 140 via communication 622.

Accordingly, the communication management resource 140 is continuously updated as to the location of the mobile communication device 120.

Via the location information 623 indicating the current location of the mobile communication device 120, the communication management resource 140 determines if new beamforming settings should be sent to the combination of wireless base station 130 and mobile communication device 120.

In one embodiment, based on the directional movement 620 as indicated by the continuously updated location information associated with the mobile communication device 120, and in anticipation that the mobile communication device 120 will eventually reside at or is currently at the location X3,Y3 based on trajectory calculations over time, the communication management resource 140 derives updated beamforming settings based on the location X1,Y1 associated with the wireless base station 130 and the location X3,Y3 associated with the mobile communication device 120.

If desired, prior to the mobile communication device 120 residing at the third location, or when the mobile communication device 120 is detected as being at the location X3, Y3, the communication management resource 140 communicates new beamforming settings to the wireless base station 130 and the mobile communication device 120 to accommodate continuous communications during the movement 620 and while the user equipment resides at the third location X3,Y3.

Further embodiments herein include, via the communication management resource 140, repeatedly generating and communicating updated beamforming settings to the wireless base station 130 and the mobile communication device 120 in response to detecting movement of the mobile communication device 120. Accordingly, the communication management resource 140 can be configured to assign different directional beamforming settings (specifying different angles and paths) to the wireless base station 130 depending on a location of the mobile communication device 120 in the wireless network environment 100.

As previously discussed, generation of the beamforming settings can occur for any suitable reason. For example, in one embodiment, the communication management resource 140 derives the beamforming settings based on detecting movement 620 of the mobile communication device 120 from location X2, Y2 to a new location X3,Y3. Additionally, or alternatively, the communication management resource 140 produces the beamforming settings 725 and communicates beamforming settings 725 to the wireless stations in response to detecting degradation of the wireless communication link quality between the mobile communication device 120 and the wireless base station 130 such as a condition in which none of the multiple paths and respective beamforming settings 425 work properly.

As an alternative to the communication management resource 140 monitoring a location of the mobile communication device 120, note that the mobile communication device 120 can be configured to monitor its own location and detect when it moves from one location (X2, Y2) to another location (X3, Y3) such as in which beamforming settings 425 are no longer valid for use. In such an instance, the mobile communication device 120 communicates with the communication management resource 340 over wireless communication link 127 to retrieve beamforming settings 725 applicable to the new location X3,Y3.

Figure 7:
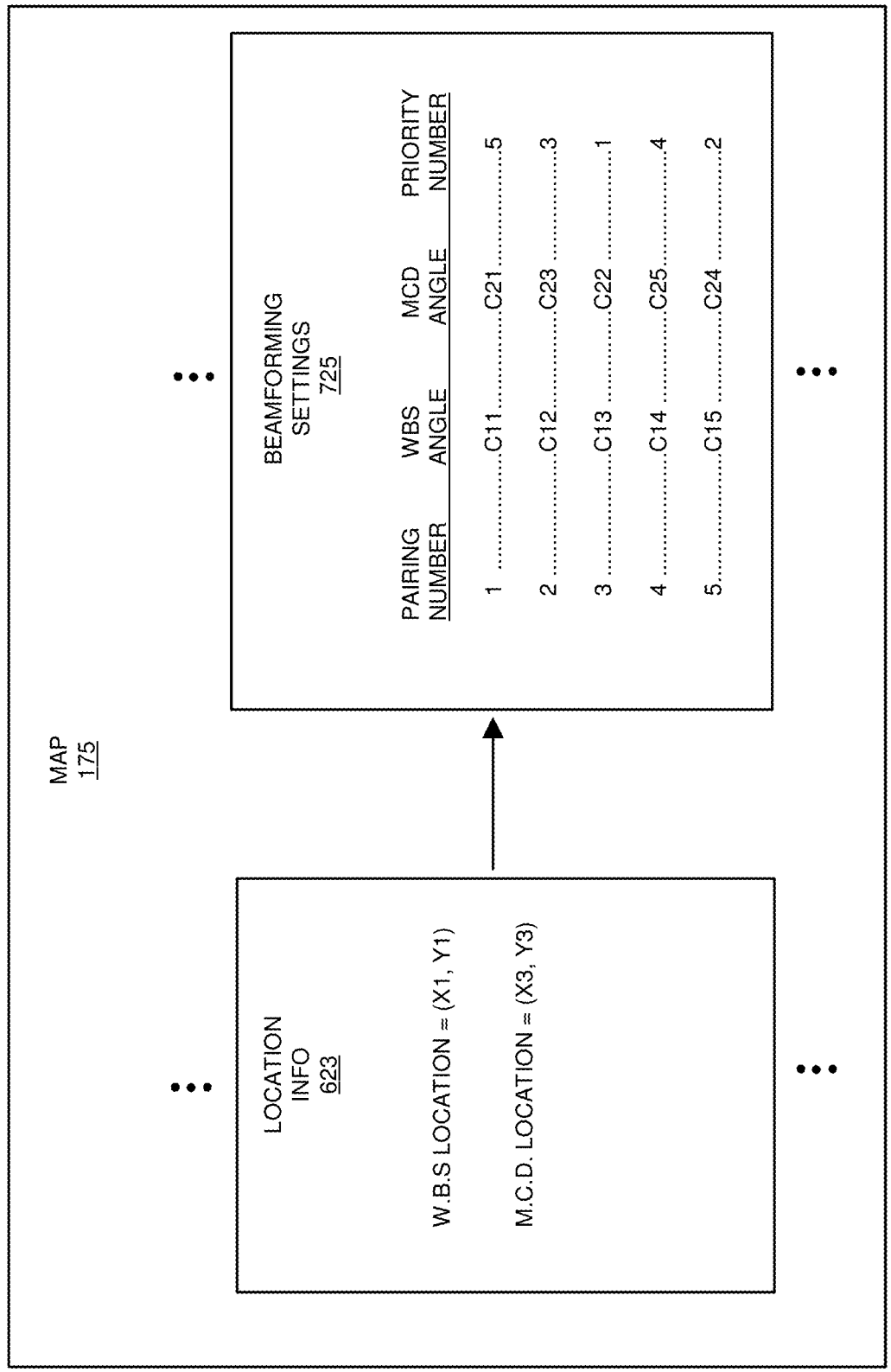
FIG. 7 is an example diagram illustrating generation of beamforming settings based on detected motion of a mobile communication device according to embodiments herein.

FIG. 7 is an example diagram illustrating generation of beamforming settings based on detected motion according to embodiments herein.

In this example embodiment, the map 175 indicates beamforming settings 725 supporting communications between the wireless base station 130 and the mobile communication device 120 when the mobile communication device 120 is at location (X3,Y3) and wireless base station 130 is at fixed location (X1,Y1).

As previously discussed, the beam setting information can be calculated in real-time when it is needed by the wireless stations or predetermined and stored in the map 175 (such as a lookup table) for immediate retrieval.

In certain embodiments, the wireless base station 130 and/or the mobile communication device 120 provide feedback regarding how well the beamforming settings work while the mobile communication device 120 is at a corresponding new location. Based on such information, it is known whether the beamforming settings are proper for the given locations of the mobile communication device 120 and the wireless base station 130.

In this example embodiment, in a similar manner as previously discussed, beamforming settings 725 include multiple pairing angles that define respective communication paths between the wireless stations.

As further shown in FIG. 7, each of the paths (as specified by pairing number) is assigned a respective priority number.

In one embodiment, the priority number indicates which path provides the lowest pathloss.

For example, pairing number 3 (path #3) in beamforming settings 725 of this example embodiment provides a lowest pathloss between the mobile communication device 120 and the wireless base station 130; pairing number 5 (path #5) in beamforming settings 725 provides a second lowest pathloss between the mobile communication device 120 and the wireless base station 130; pairing number 2 (path #2) provides a third pathloss between the mobile communication device 120 and the wireless base station 130; pairing number 4 (path #4) provides a fourth lowest pathloss between the mobile communication device 120 and the wireless base station 130; pairing number 1 (path #1) provides a fifth lowest pathloss between the mobile communication device 120 and the wireless base station 130.

Note again that, in addition to generating the beamforming settings based on the location of the mobile communication device 120 and the location of the wireless base station 130, the communication management resource 140 can be configured to generate the beamforming settings based at least in part on antenna attributes of the mobile communication device 120 and antenna attributes of the wireless base station 130.

Figure 8:
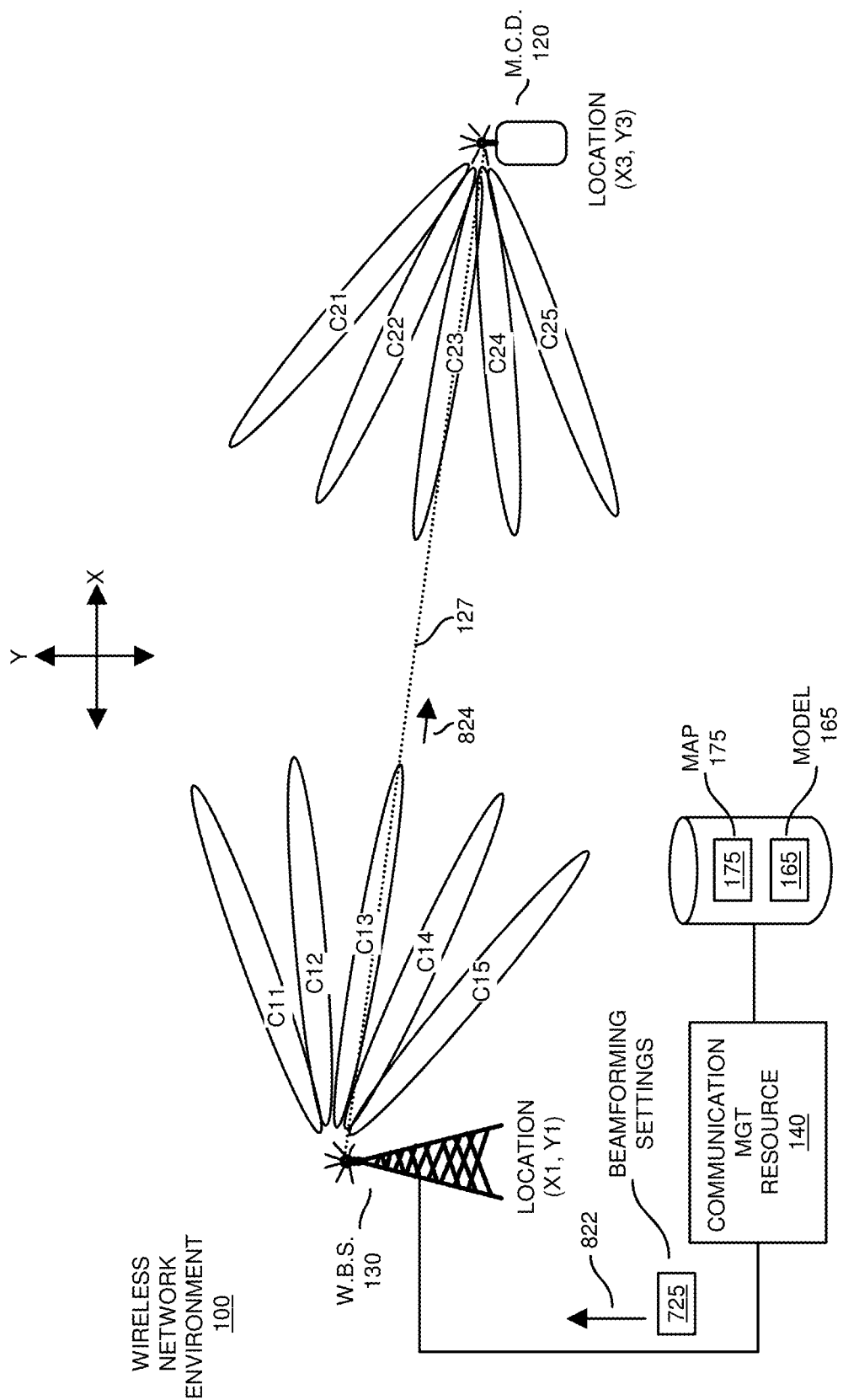
FIG. 8 is an example diagram illustrating beamforming options based on locations of a wireless base station and corresponding mobile communication device according to embodiments herein.

Example of the paths associated with beamforming settings 725 is shown in FIG. 8 below.

FIG. 8 is an example diagram illustrating beamforming options based on locations of a wireless base station and corresponding mobile communication device according to embodiments herein.

As previously discussed, based on the locations of the mobile communication device 120 and the wireless base station 130, the communication management resource 140 converts the received location information to beamforming settings 725. More specifically, the communication management resource 140 maps location X1,Y1 and the location X3,Y3 to beamforming settings 725 for us by the wireless stations.

In one embodiment, the beamforming settings 725 are pre-generated based on prior use of the settings in the wireless network environment 100. In such an instance, the communication management resource 140 derives the beamforming settings 725 for the mobile communication device 120 and the wireless base station 130 via mapping a combination of the first location X1,Y1 and the second location X3,Y3 to the beamforming settings 725.

Additionally, or alternatively, the communication management resource 140 calculates the beamforming settings based on the model 165.

Further in this example embodiment, via communications 822, the communication management resource 140 (or other suitable entity) communicates the beamforming settings 725 to the wireless base station 130. The wireless base station 130 uses the beamforming settings 725 to identify the different possible communication paths and corresponding wireless base station angles C11, C12, C13, C14, and C15 as previously discussed.

The wireless base station 130 communicates all or a portion of the beamforming settings information 725 over the wireless communication link 127 to the mobile communication device 120 via communications 824. Accordingly, the mobile communication device 120 is notified of the different angular settings C21, C22, C23, C24, and C25 associated with the mobile communication device 120 while at location X3, Y3.

In a similar manner as previously discussed, the different beamforming directions and paths defined by the beamforming settings 725 are selectable by the mobile communication device 120 and/or wireless base station 130. If a selected path does not provide sufficient link quality to communicate over the wireless communication link 127, the mobile communication device 120 and/or wireless base station 130 select a different beamforming path.

Note that the wireless network environment 100 and corresponding wireless base station 130 supports wireless connectivity to multiple mobile communication devices. In such an instance, the wireless base station 130 provides similar capability of identifying suitable wireless beamforming paths based on a location of each mobile communication device in the wireless network environment 100 and then notifying the wireless base station 130 and respective mobile communication device 120 of the suitable beamforming settings (selectable paths and angles) for the mobile communication devices current location.

Figure 9:
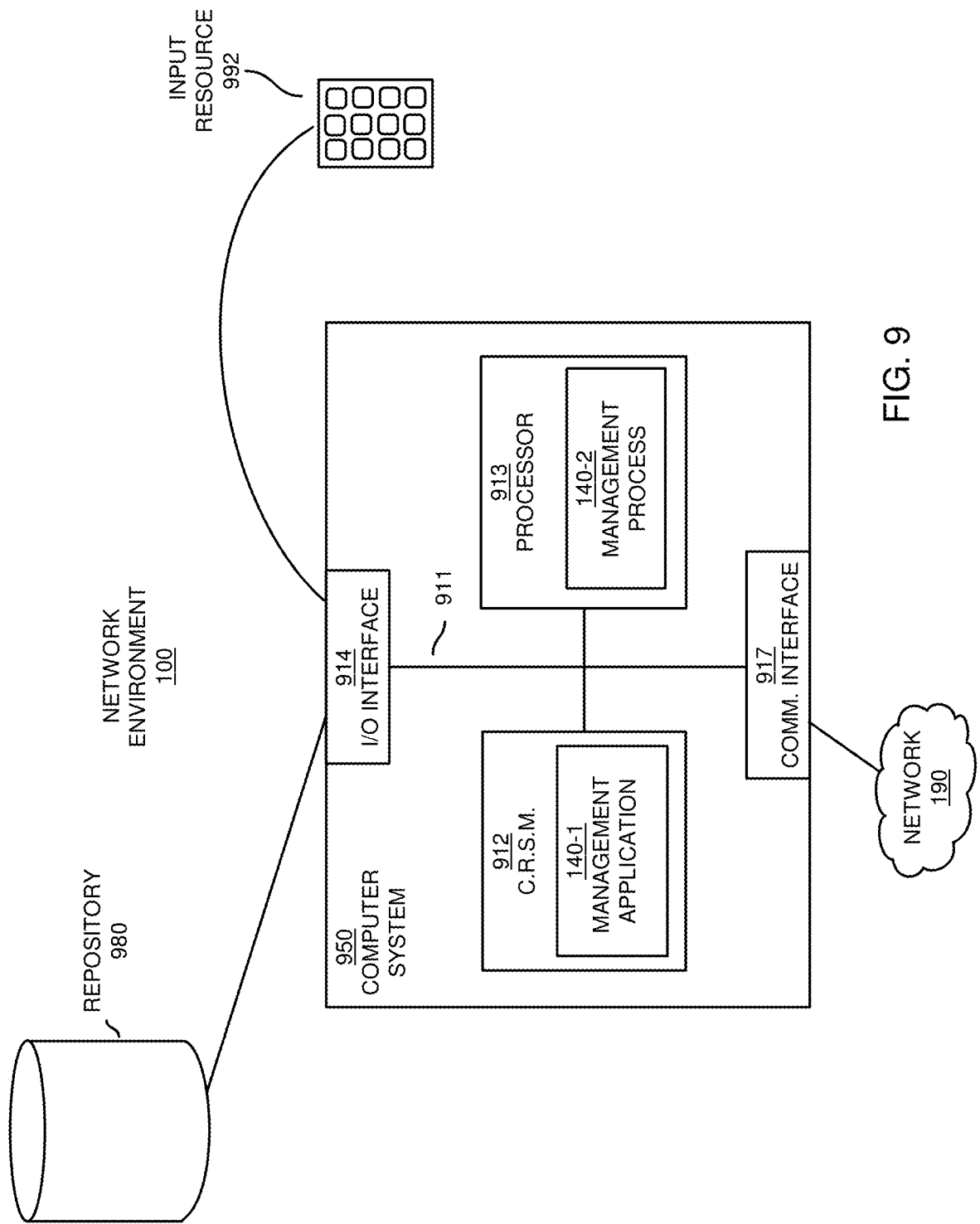
FIG. 9 is an example diagram illustrating a computer architecture in which to execute one or more embodiments as discussed herein.

FIG. 9 is an example block diagram of a computer system for implementing any of the operations as discussed herein according to embodiments herein.

Any of the resources (e.g., wireless base station 130, mobile communication device 120, communication management resource, etc.) can be configured to include a processor and executable instructions to carry out the different operations as discussed herein.

As shown, computer system 950 of the present example can include an interconnect 911 that couples computer readable storage media 912 such as a non-transitory type of media (i.e., any type of hardware storage medium) in which digital information can be stored and retrieved, a processor 913 (computer processor hardware), I/O interface 914, and a communication interface 917.

Computer readable storage medium 912 can be any hardware storage device such as memory, optical storage, hard drive, floppy disk, etc. In one embodiment, the computer readable storage medium 912 stores instructions and/or data.

As shown, computer readable storage media 912 can be encoded with management application 140-1 (e.g., including instructions) to carry out any of the operations as discussed herein.

During operation of one embodiment, processor 913 accesses computer readable storage media 912 via the use of interconnect 911 in order to launch, run, execute, interpret or otherwise perform the instructions in management application 140-1 (such as instantiation of communication management resource 140, wireless base station 130, mobile communication device 120, etc.) stored on computer readable storage medium 912. Execution of the management application 140-1 produces management process 140-2 to carry out any of the operations and/or processes as discussed herein.

Those skilled in the art will understand that the computer system 950 can include other processes and/or software and hardware components, such as an operating system that controls allocation and use of hardware resources to content management application 140-1.

In accordance with different embodiments, note that computer system may be or included in any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc.

As previously discussed, the computer system 950 may reside at any location or can be included in any suitable resource in any network environment to implement functionality as discussed herein.

Functionality supported by the different resources will now be discussed via flowcharts in FIG. 10. Note that the steps in the flowcharts below can be executed in any suitable order.

Figure 10:
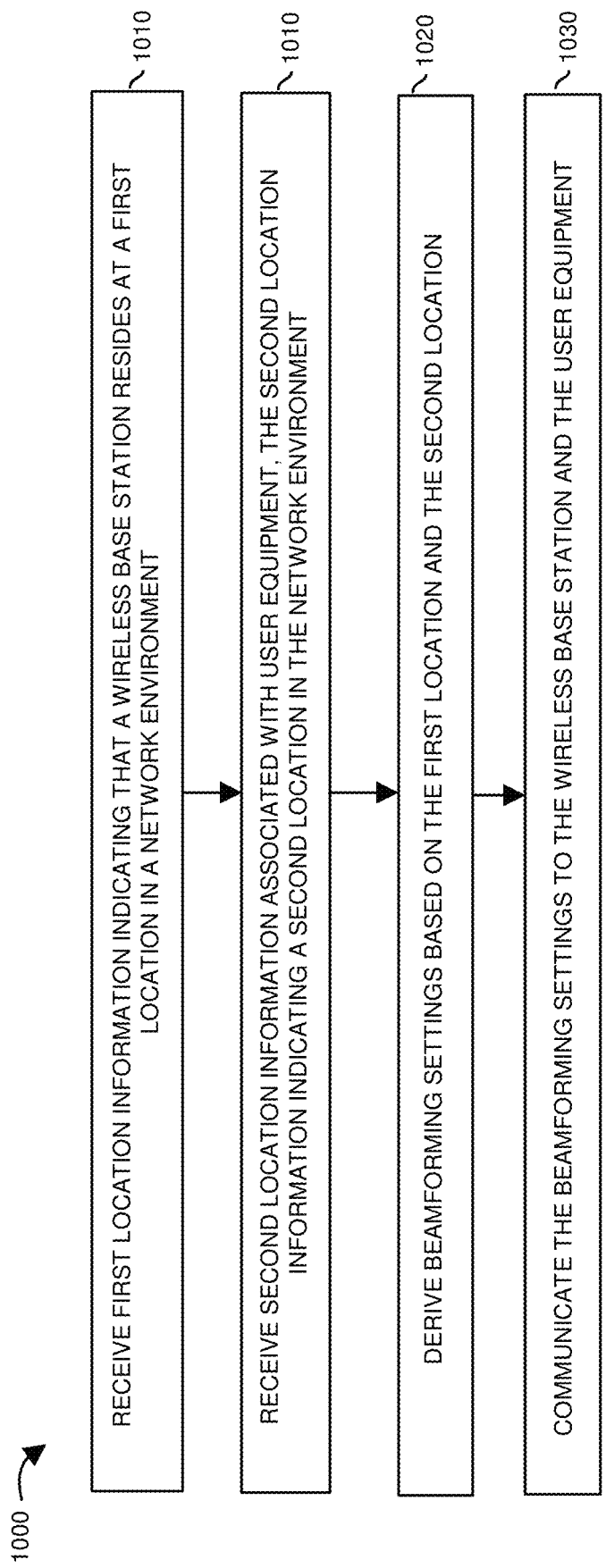
FIG. 10 is an example diagram illustrating various methods according to embodiments herein.

FIG. 10 is a flowchart 1000 illustrating an example method according to embodiments. Note that there will be some overlap with respect to concepts as discussed above.

In processing operation 1010, the communication management resource 140 receives first location information indicating that a wireless base station 130 resides at a first location (such as X1, Y1) in the wireless network environment 100.

In processing operation 1020, the communication management resource 140 receives second location information associated with user equipment (a.k.a., mobile communication device 120). The second location information indicates a second location (such as X2, Y2) in the wireless network environment 100.

In processing operation 1030, the communication management resource 140 derives beamforming settings 425 based on the first location (X1, Y1) and the second location (X2, Y2).

In processing operation 1040, the communication management resource 140 distributes the beamforming settings 425 to the wireless base station 130 and the user equipment (mobile communication device 120).

Note again that techniques herein are well suited to facilitate implementation of beamforming in a network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method comprising:
    receiving first location information indicating that a wireless base station resides at a first location in a network environment;
    receiving second location information associated with user equipment, the second location information indicating a second location in the network environment;
    deriving beamforming settings based on the first location and the second location, the beamforming settings derived via calculated pathlosses along different paths in the network environment, the pathlosses along the different paths calculated from a pathloss model of the network environment including the wireless base station and the user equipment; and
    distributing the beamforming settings to the wireless base station and the user equipment.

2. The method as in claim 1, wherein deriving the beamforming settings includes:
    producing the beamforming settings to indicate multiple pairings of beamforming angles, each of the multiple pairings including: i) a respective beamforming angle for use by the user equipment to communicate with the wireless base station, and ii) a corresponding beamforming angle for use by the wireless base station to communicate with the user equipment.

3. The method as in claim 1 further comprising:
    storing the beamforming settings associated with the first location and the second location prior to detecting presence of the user equipment at the second location.

4. The method as in claim 3, wherein deriving the beamforming settings based on the first location and the second location includes mapping a combination of the first location and the second location to the beamforming settings.

5. The method as in claim 3 further comprising: producing the pathloss model including:
    receiving information indicating attributes of different obstacles in the network environment; and
    generating the pathloss model based on the attributes of the different obstacles.

6. The method as in claim 5, wherein the attributes include a dimension and location of the different obstacles.

7. The method as in claim 5, wherein the attributes of the different obstacles include reflection/absorption properties of the different obstacles.

8. The method as in claim 1 further comprising:
deriving the beamforming settings based at least in part on antenna attributes of the user equipment and antenna attributes of the wireless base station.

9. The method as in claim 1, wherein the second location information indicates a location of the user equipment in the network environment.

10. The method as in claim 9, wherein the beamforming settings are first beamforming settings derived from the first location and the second location, the method further comprising:
monitoring a direction of movement of the user equipment at the second location towards a third location;
deriving second beamforming settings based on the first location and the third location; and
communicating the second beamforming settings to the wireless base station.

11. The method as in claim 10, wherein the second beamforming settings indicate multiple directional settings with respect to the third location.

12. The method as in claim 1 further comprising:
producing the beamforming settings to include priority information and multiple directional settings, the priority information indicating a priority ranking associated with each of the multiple directional settings.

13. The method as in claim 12, wherein each of the multiple directional settings is selectable by the user equipment.

14. The method as in claim 1 further comprising:
repeatedly generating and communicating updated beamforming settings to the wireless base station and the user equipment in response to detecting movement of the user equipment.

15. The method as in claim 1 further comprising:
producing the beamforming settings in response to detecting degradation of communication link quality between the user equipment and the wireless base station.

16. The method as in claim 1, wherein deriving the beamforming settings includes:
determining which of the different paths provides the lowest pathloss.

17. The method as in claim 1, wherein deriving the beamforming settings includes:
calculating a respective pathloss value for each of the different paths using the pathloss model.

18. The method as in claim 1, wherein the second location indicates a location of the user equipment, the user equipment providing the second location information.

19. A system comprising:
a communication management resource operative to:
receive first location information indicating that a wireless base station resides at a first location in a network environment;
receive second location information associated with user equipment, the second location information indicating a second location in the network environment;
derive beamforming settings based on the first location and the second location, the beamforming settings derived via calculated pathlosses along different paths in the network environment, the pathlosses along the different paths calculated from a pathloss model of the network environment including the wireless base station and the user equipment; and
distribute the beamforming settings to the wireless base station and the user equipment.

20. The system as in claim 19, wherein the communication management resource is further operative to:
produce the beamforming settings to indicate multiple pairings of beamforming angles, each of the multiple pairings including: i) a respective beamforming angle for use by the user equipment to communicate with the wireless base station, and ii) a corresponding beamforming angle for use by the wireless base station to communicate with the user equipment.

21. The system as in claim 19, wherein the communication management resource is further operative to:
produce the pathloss model of the network environment including the wireless base station and the user equipment.

22. The system as in claim 19, wherein the communication management resource is further operative to:
store the beamforming settings associated with the first location and the second location prior to detecting presence of the user equipment at the second location.

23. The system as in claim 22, wherein the communication management resource is further operative to:
derive the beamforming settings based on the first location and the second location via mapping a combination of the first location and the second location to the beamforming settings.

24. The system as in claim 19, wherein the communication management resource is further operative to:
derive the beamforming settings based at least in part on antenna attributes of the user equipment and antenna attributes of the wireless base station.

25. The system as in claim 19, wherein the second location information indicates a location of the user equipment.

26. The system as in claim 25, wherein the beamforming settings are first beamforming settings derived from the first location and the second location, the communication management resource further operative to:
monitor a direction of movement of the user equipment at the second location towards a third location;
derive second beamforming settings based on the first location and the third location; and
communicate the second beamforming settings to the wireless base station and the user equipment.

27. The system as in claim 19, wherein the second beamforming settings indicate multiple directional settings with respect to the third location.

28. The system as in claim 19, wherein the communication management resource is further operative to:
produce the beamforming settings to include priority information and multiple directional settings, the priority information indicating a priority ranking associated with each of multiple directional settings.

29. The system as in claim 28, wherein each of the multiple directional settings is selectable by the user equipment.

30. The system as in claim 19, wherein the communication management resource is further operative to:
repeatedly generate and communicate updated beamforming settings to the wireless base station and the user equipment in response to detecting movement of the user equipment.

31. The system as in claim 19, wherein the communication management resource is further operative to:

produce the beamforming settings in response to detecting degradation of communications between the user equipment and the wireless base station.

32. Computer-readable storage hardware having instructions stored thereon, the instructions, when carried out by computer processor hardware, cause the computer processor hardware to:
receive first location information indicating that a wireless base station resides at a first location in a network environment;
receive second location information associated with user equipment, the second location information indicating a second location in the network environment;
derive beamforming settings based on the first location and the second location, the beamforming settings derived via calculation of pathlosses along different paths in the wireless network environment the pathlosses along the different paths calculated from a pathloss model of the network environment including the wireless base station and the user equipment; and
distribute the beamforming settings to the wireless base station and the user equipment.

33. The method as in claim 1, wherein deriving the beamforming settings includes calculating the pathlosses along the different paths between the first location and the second location, the wireless base station residing at the first location, the user equipment residing at the second location.

34. A method comprising:
receiving first location information indicating that a wireless base station resides at a first location in a network environment;
receiving second location information associated with user equipment, the second location information indicating a second location in the network environment;
deriving beamforming settings based on the first location and the second location, the beamforming settings derived via calculated pathlosses along different paths in the network environment; and
distributing the beamforming settings to the wireless base station and the user equipment; and
wherein deriving the beamforming settings includes calculating the pathlosses along the different paths between the first location at which the wireless base station resides and an anticipated location at which the user equipment will reside.

35. A method comprising:
receiving first location information indicating that a wireless base station resides at a first location in a network environment;
receiving second location information associated with user equipment, the second location information indicating a second location in the network environment;
deriving beamforming settings based on the first location and the second location, the beamforming settings derived via calculated pathlosses along different paths in the network environment;
distributing the beamforming settings to the wireless base station and the user equipment; and
wherein the pathlosses along the different paths in the network environment are determined via trial and error.

* * * * *

UNITED STATES PATENT AND TRADEMARK OFFICE
CERTIFICATE OF CORRECTION

PATENT NO.        : 11,152,989 B1
APPLICATION NO.   : 16/842148
DATED             : October 19, 2021
INVENTOR(S)       : Saran Khalid Page 1 of 1

It is certified that error appears in the above-identified patent and that said Letters Patent is hereby corrected as shown below:

In the Claims

Column 23, Line 17, after "environment" add -- , --

Signed and Sealed this
Twenty-fifth Day of January, 2022

Drew Hirshfeld
*Performing the Functions and Duties of the
Under Secretary of Commerce for Intellectual Property and
Director of the United States Patent and Trademark Office*